(12) United States Patent
Pelsoeczy

(10) Patent No.: US 8,317,938 B2
(45) Date of Patent: Nov. 27, 2012

(54) NITRATABLE STEEL MATERIAL COMPOSITION FOR PRODUCING PISTON RINGS AND CYLINDRICAL SLEEVES

(75) Inventor: Laszlo Pelsoeczy, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 13/259,300

(22) PCT Filed: Nov. 23, 2009

(86) PCT No.: PCT/EP2009/008332
§ 371 (c)(1),
(2), (4) Date: Sep. 23, 2011

(87) PCT Pub. No.: WO2010/108528
PCT Pub. Date: Sep. 30, 2010

(65) Prior Publication Data
US 2012/0018051 A1   Jan. 26, 2012

(30) Foreign Application Priority Data
Mar. 26, 2009   (DE) ................. 10 2009 015 009

(51) Int. Cl.
*C21D 8/00* (2006.01)
*C21D 6/00* (2006.01)
*C23C 8/00* (2006.01)

(52) U.S. Cl. ........................... 148/221; 148/318

(58) Field of Classification Search ............ 420/84, 420/582, 583, 586.1; 164/47; 148/221, 583, 148/542, 548, 318
See application file for complete search history.

(56) References Cited

U.S. PATENT DOCUMENTS

| | | | | |
|---|---|---|---|---|
| 1,369,592 | A * | 2/1921 | White | 277/434 |
| 2,280,284 | A * | 4/1942 | Critchett et al. | 420/83 |
| 3,698,964 | A | 10/1972 | Caule et al. | |
| 4,435,226 | A * | 3/1984 | Neuhauser et al. | 148/545 |
| 4,966,751 | A * | 10/1990 | Kaede et al. | 420/34 |
| 4,985,092 | A | 1/1991 | Kaede et al. | |
| 5,352,271 | A * | 10/1994 | Margaria et al. | 75/526 |
| 7,052,019 | B2 * | 5/2006 | Miida | 277/443 |
| 2002/0005616 | A1 | 1/2002 | Kubota | |
| 2006/0048865 | A1 | 3/2006 | Fujita et al. | |
| 2006/0169367 | A1 | 8/2006 | Yuse et al. | |
| 2006/0191508 | A1 * | 8/2006 | Otsuka et al. | 123/193.6 |
| 2010/0192895 | A1 * | 8/2010 | Pelsoeczy | 123/193.2 |

FOREIGN PATENT DOCUMENTS

| | | |
|---|---|---|
| CH | 318 954 A | 1/1957 |
| DE | 10 2006 038670 A1 | 2/2008 |
| EP | 1 143 025 A | 10/2001 |
| JP | 07 188852 A | 7/1995 |
| JP | 2000 282177 A | 10/2000 |
| WO | WO 03/098079 A | 11/2003 |

* cited by examiner

*Primary Examiner* — Jessee R. Roe
(74) *Attorney, Agent, or Firm* — Robert L. Stearns; Dickinson Wright, PLLC

(57) ABSTRACT

A steel composition which has good nitridability, in particular for the manufacture of piston rings and cylinder liners, contains the following elements in the following quantities expressed with respect to 100 weight % of the steel composition: 0.5-1.5 weight % Al, 0.5-1.2 weight % C, 68.2-96.9 weight % Fe, 0.1-3.0 weight % Mn and 2.0-10.0 weight % Si. It can be manufactured by producing a melt of starting materials and casting the melt into a prepared mold. Nitriding the steel composition obtained results in a nitrided steel composition produced by gravity casting manufacturing with properties that surpass those of hardened and tempered spheroidal graphite.

3 Claims, No Drawings

NITRATABLE STEEL MATERIAL COMPOSITION FOR PRODUCING PISTON RINGS AND CYLINDRICAL SLEEVES

BACKGROUND OF THE INVENTION

1. Technical Field

The present invention relates to piston rings which have good nitridability. Furthermore, the present invention relates to a nitrided piston ring which can be manufactured from the piston ring with good nitridability of the invention. In addition, the present invention relates to a process for the manufacture of the piston rings with good nitridability of the invention and to a process for the manufacture of the nitrided piston rings in accordance with the invention.

2. Related Art

In an internal combustion engine, piston rings seal the gap between the piston head and the cylinder wall of the combustion chamber. As the piston moves back and forth, one side of the piston ring slides with its outer circumferential surface against the cylinder wall in a permanently spring-loaded position, and because of the tilting movements of the piston, the other side of the piston ring slides in an oscillating manner in its piston ring groove, whereupon its flanks bear alternately on upper or lower groove flanks of the piston ring groove. The mutual sliding of these components against each other results in a greater or lesser amount of wear, depending on the material; if it runs dry, this can lead to so-called fretting, scoring and finally destruction of the engine. In order to improve the slide and wear behaviour of the piston rings against the cylinder wall, their circumferential surface has been provided with coatings formed from various materials.

In order to produce high performance internal combustion engine parts, such as piston rings, cast iron materials or cast iron alloys are usually used. In high performance engines, the requirements placed upon piston rings, in particular compression rings, are becoming ever more stringent, for example as regards peak compressive pressure, combustion temperature, EGR and lubricant film reduction, which substantially affect their functional properties such as wear, scorch resistance, micro-welding and corrosion resistance.

Prior art cast iron materials, however, are at great risk of breaking; in fact, when using current materials, the rings frequently break. Increased mechanico-dynamic loads result in shorter service lifetimes for piston rings. Severe wear and corrosion occurs on the running faces and flanks.

Higher ignition pressures, reduced emissions and direct fuel injection mean increased loads on the piston rings. This results in damage and a build-up of piston material, especially on the lower piston ring flank.

Because of the higher mechanical and dynamic stresses on piston rings, more and more engine manufacturers are demanding piston rings from high-grade steel (hardened and tempered and high alloy, such as grade 1.4112, for example). Ferrous materials containing less than 2.08 weight % of carbon are herein known as steel. If the carbon content is higher, it is known as cast iron. Compared with cast iron, steels have better strength and toughness properties as there is no interference from free graphite in the basic microstructure.

Usually, high chrome alloyed martensitic steels are used for the manufacture of steel piston rings. However, using such steels suffers from the disadvantage that the manufacturing costs are significantly higher than those of cast iron components.

Steel piston rings are manufactured from profiled wire. The profiled wire is coiled into a circular shape, cut and pulled over a "non-round" mandrel. The piston ring attains its desired non-round shape on this mandrel by means of an annealing process, which imparts the required tangential forces. A further disadvantage of the manufacture of piston rings from steel is that beyond a certain diameter, ring manufacture (coiling) from steel wire is no longer possible. Piston rings formed from cast iron, on the other hand, are already non-round when cast, so that from the outset they have an ideal shape.

Cast iron has a substantially lower melting point than steel. The difference may be up to 350° C., depending on the chemical composition. Thus, cast iron is easier to melt and to cast, since a lower melting point means the casting temperature is lower and thus the shrinkage on cooling is smaller, and so the cast material has fewer pipe defects or heat and cold cracking. A lower casting temperature also results in a lower stress on the material of the mould (erosion, gas porosity, sand inclusions) and the furnace and also results in lower melting costs.

The melting point of a ferrous material does not simply depend on the carbon content, but also on its "degree of saturation". The following empirical formula applies:

$$S_c = C/(4.26 - 1/3(Si+P))$$

The closer the degree of saturation is to 1, the lower is the melting point. For cast iron, a degree of saturation of 1.0 is usually desirable, whereupon the cast iron has a melting point of 1150° C. The degree of saturation of steel is approximately 0.18, depending on the chemical composition. Eutectic steel has a melting point of 1500° C.

The degree of saturation can be substantially influenced by the Si or P content. As an example, a 3 weight % higher silicon content has a similar effect to a 1 weight % higher C content. Thus, it is possible to manufacture a steel with a C content of 1 weight % and 9.78 weight % silicon content which has the same melting point as cast iron with a degree of saturation of 1.0 (C: 3.26 weight %; Si: 3.0 weight %).

A drastic increase in the Si content can raise the degree of saturation of the steel and reduce the melting point to that for cast iron. Thus, it is possible to manufacture steel with the aid of the same technology that is used for the manufacture of cast iron, for example GOE 44.

Piston rings formed from high silicon cast steel are known in the art. However, the silicon present in larger quantities has a negative influence on the hardenability of the material since its austenite transition temperature, "Ac3", is increased.

A process that is normal in the art for nevertheless increasing the hardness of the piston ring surface could consist in nitriding the material. However, it has been shown that prior art high silicon steel castings have poor nitridability.

SUMMARY OF THE INVENTION

Thus, the aim of the invention is to provide piston rings which have a high silicon steel composition as the main body and which have good nitridability, as well as nitrided piston rings. Upon manufacture by gravity casting, the properties of the nitrided steel composition of the nitrided piston rings should surpass the properties of hardened and tempered spheroidal graphite cast iron in at least one of the following points:
  mechanical properties such as elastic modulus, bending strength;
  break strength;
  form stability;
  wear on the flanks;
  wear on the running surfaces.

In accordance with the invention, this aim is achieved by means of piston rings which have as the main body a steel composition which contains the following elements in the following proportions:

| | | |
|---|---|---|
| Al: | 0.5-1.5 | weight % |
| C: | 0.5-1.2 | weight % |
| Fe: | 68.2-96.9 | weight % |
| Mn: | 0.1-3.0 | weight % |
| Si: | 2.0-10.0 | weight % |
| B: | max 0.1 | weight % |
| Cr: | max 4.0 | weight % |
| Cu: | max 2.0 | weight % |
| Mo: | max 3.0 | weight % |
| Nb: | max 0.05 | weight % |
| Ni: | max 4.0 | weight % |
| P: | max 0.1 | weight % |
| S: | max 0.05 | weight % |
| Sn: | max 0.05 | weight % |
| Ti: | max 0.2 | weight % |
| V: | max 2.0 | weight % |
| W: | max 0.5 | weight % | wherein the steel composition contains only elements selected from the group consisting of Al, B, C, Cr, Cu, Fe, Mn, Mo, Nb, Ni, P, S, Si, Sn, Ti, V and W, the sum of said elements being 100 weight %.

It is assumed that the good nitridability of the piston rings of the invention is due to the 0.5-1.5 weight % aluminium content. In the nitriding process, aluminium forms very hard nitrides.

Nitriding the piston rings with good nitridability of the invention produces nitrided piston rings in accordance with the invention.

The nitrided piston rings of the invention have a reduced tendency to change their shape when heated strongly, thus ensuring es long-term high performance and, moreover, reduced oil consumption.

The nitrided piston rings of the invention also have the advantage that, for example, they can be manufactured using machinery and technology for manufacturing cast iron parts. In addition, the manufacturing costs correspond to those of cast iron piston rings, providing cost savings for the manufacturer and improving margins. Similarly, the material parameters can be adjusted independently of the supplier.

Piston rings in accordance with the invention are manufactured in a process which comprises the following steps:
  a. producing a molten mass from the starting materials; and
  b. casting the molten mass into a prepared mould.

Examples of starting materials are steel scrap, return scrap and alloying substances. The melting process is carried out in a furnace, preferably a cupola furnace. Next, a blank is produced when the melt solidifies. The piston ring can thus be cast using methods that are known in the art, for example by centrifugal casting processes, continuous casting processes, die stamping processes, Croning processes or, as is preferable, green sand moulding.

After the piston ring has cooled, the mould is emptied and the blank obtained is cleaned.

If necessary, the piston ring may then be quenched and tempered. The following steps accomplish this:
  c. austenitization of the piston ring above its Ac3 temperature;
  d. quenching the piston ring in a suitable quenching medium; and
  e. tempering the piston ring at a temperature in the range 400° C. to 700° C. in a controlled atmosphere furnace.

Preferably, oil is used as the quenching medium.

In order to manufacture a nitrided piston ring in accordance with the invention, following the process steps mentioned above, nitriding of the piston ring obtained is carried out. This can, for example, be accomplished by gas nitriding, plasma nitriding or pressure nitriding.

DETAILED DESCRIPTION

The following example illustrates the invention without limiting it.

Example

A piston ring was manufactured from a highly nitridable steel composition in accordance with the invention having the following composition:

| | |
|---|---|
| Al: | 1.1 weight % |
| B: | 0.001 weight % |
| C: | 0.7 weight % |
| Cr: | 2.0 weight % |
| Cu: | 0.05 weight % |
| Mn: | 0.45 weight % |
| Mo: | 0.5 weight % |
| Nb: | 0.002 weight % |
| P: | 0.03 weight % |
| S: | 0.009 weight % |
| Si: | 3.0 weight % |
| Sn: | 0.001 weight % |
| Ti: | 0.003 weight % |
| V: | 0.11 weight % |
| W: | 0.003 weight % |
| Fe: | remainder |

It was obtained by producing a molten mass from the starting materials (steel scrap, return scrap and alloying substances) and casting the melt into a prepared green sand mould. Next, the mould was emptied and the piston ring obtained was cleaned. The piston ring was then quenched and tempered. This was accomplished by austenitization above the Ac3 temperature of the steel composition, quenching in oil and tempering at a temperature in the range 400° C. to 700° C. in a controlled atmosphere furnace.

Finally, the surface of the piston ring obtained was nitrided. In the nitrided regions, a hardness of more than 1000 HV was obtained, which guaranteed a high resistance to flank wear and running face wear. The hardness in this case was determined in accordance with DIN 6773.

The invention claimed is:

1. Piston ring which comprises as a main body a nitride steel obtained by nitriding a steel composition which contains the following elements in the proportions given, expressed with respect to 100 weight % of the steel composition:

| | |
|---|---|
| Al: | 1.1 weight % |
| C: | 0.7 weight % |
| Fe: | remainder |
| Mn: | 0.45 weight % |
| Si: | 3.0 weight % |
| B: | 0.001 weight % |
| Cr: | 2.0 weight % |
| Cu: | 0.05 weight % |
| Mo: | 0.5 weight % |
| Nb: | 0.002 weight % |
| P: | 0.03 weight % |
| S: | 0.009 weight % |
| Sn: | 0.001 weight % |

-continued

| | |
|---|---|
| Ti: | 0.003 weight % |
| V: | 0.11 weight % |
| W: | 0.003 weight %. |

2. Process for the manufacture of a piston ring comprising:
a. producing a molten mass from a steel composition which contains the following elements in the proportions given, expressed with respect to 100 weight % of the steel composition:

| | |
|---|---|
| Al: | 0.5-1.5 weight % |
| C: | >0.7-1.2 weight % |
| Fe: | 68.2-96.9 weight % |
| Mn: | 0.1-3.0 weight % |
| Si: | 2.0-<4.0 weight % | b. casting the molten mass into a prepared mold,
c. nitriding the steel composition obtained, and
wherein the manufacture of the steel composition further comprises the following steps:
d. austenitizing the steel composition above its Ac3 temperature;
e. quenching the steel composition in a suitable quenching medium; and
f. tempering the steel composition at a temperature in the range of 400° C. to 700° C. in a controlled atmosphere furnace.

3. Process for the manufacture of a piston ring comprising:
a. producing a molten mass from a steel composition which contains the following elements in the proportions given, expressed with respect to 100 weight % of the steel composition:

| | |
|---|---|
| Al: | 1.1 weight % |
| C: | 0.7 weight % |
| Mn: | 0.45 weight % |
| Si: | 3.0 weight % |
| B: | 0.001 weight % |
| Cr: | 2.0 weight % |
| Cu: | 0.05 weight % |
| Mo: | 0.5 weight % |
| Nb: | 0.002 weight % |
| P: | 0.03 weight % |
| S: | 0.009 weight % |
| Sn: | 0.001 weight % |
| Ti: | 0.003 weight % |
| V: | 0.11 weight % |
| W: | 0.003 weight % |
| Fe: | remainder | b. casting the molten mass into a prepared mold, and
c. nitriding the steel composition obtained.

* * * * *